Oct. 10, 1939.                     W. J. JAEGER                     2,175,294
                                   RIM MOUNTING
                              Filed Jan. 16, 1939                 2 Sheets-Sheet 1
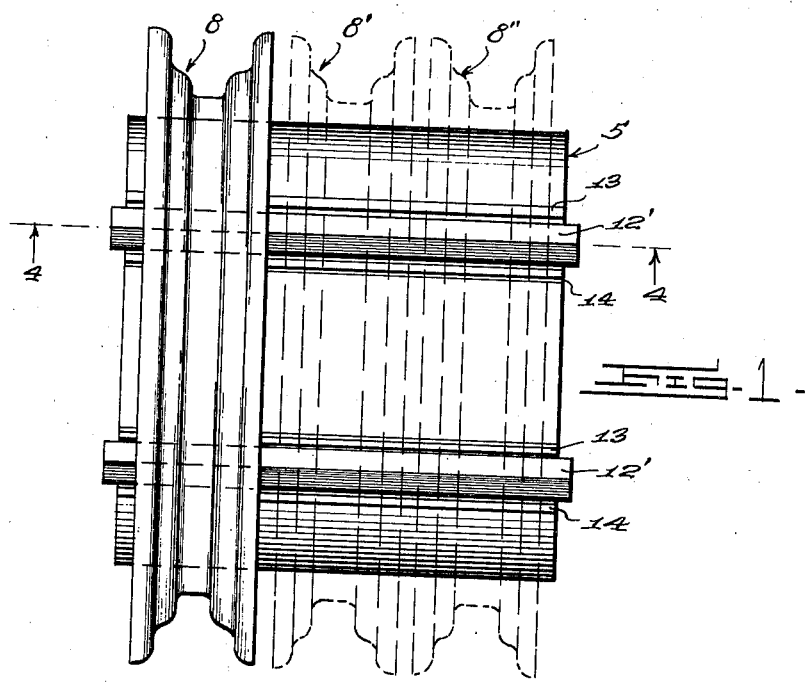
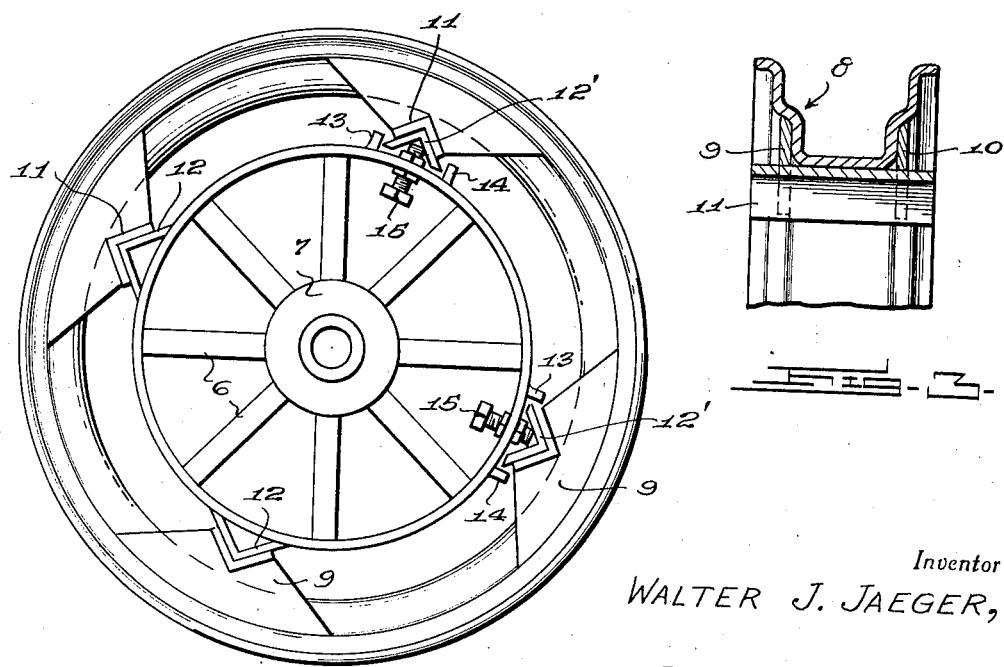
Inventor
WALTER J. JAEGER,
By Clarence A. O'Brien
and Hyman Berman
Attorneys

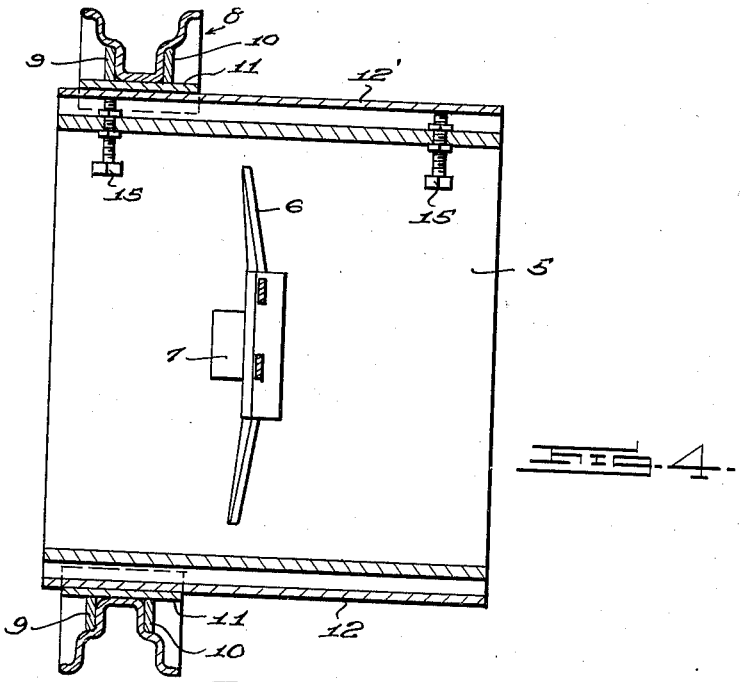
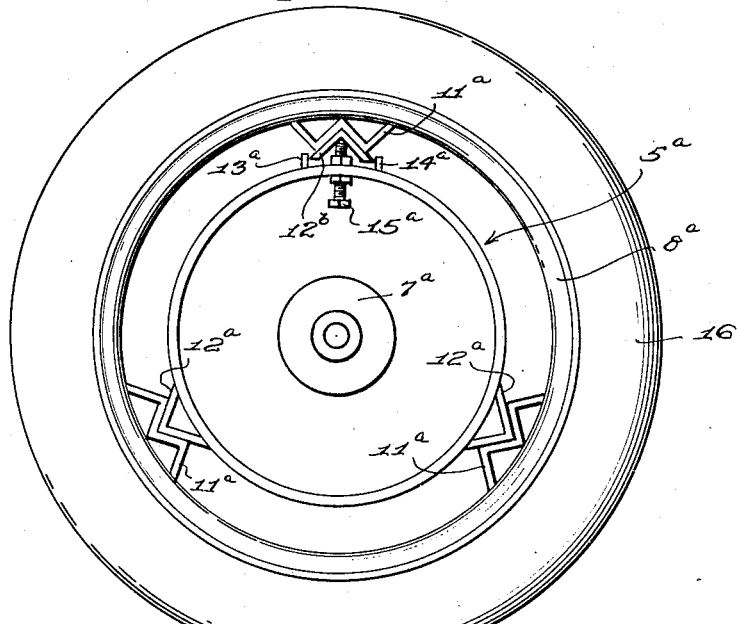

Patented Oct. 10, 1939

2,175,294

UNITED STATES PATENT OFFICE 2,175,294

RIM MOUNTING

Walter J. Jaeger, Imperial, Nebr.

Application January 16, 1939, Serial No. 251,266

5 Claims. (Cl. 301—5)

My invention relates generally to a vehicle wheel equipped with multiple tire accommodating rims which are axially adjustable, and an important object of my invention is to provide arrangements of this character whereby the wheels may be accommodated for different terrain, different load and traction conditions, and in the case of agricultural tractors, to accommodate different widths of rowed crops.

Another important object of my invention is to provide vehicle wheels of the character indicated which are especially adapted to be used as front and/or rear wheels for tractors and the like vehicles, whereby the vehicles may be especially and particularly adapted for specified different tasks, without necessitating the use of a number of different types of wheels.

Other important objects and advantages of my invention will be apparent from a reading of the following description taken in connection with the drawings, wherein for purposes of illustration I have set forth preferred embodiments of my invention.

In the drawings:—

Figure 1 is a side elevational view of an embodiment of my invention especially adapted for rear wheel use, and showing the employment thereon of one tire accommodating rim as well as two and/or three such rims, the latter appearing in dotted lines.

Figure 2 is an outboard elevational view of Figure 1.

Figure 3 is an enlarged transverse vertical sectional view taken through one of the rims.

Figure 4 is a longitudinal sectional view taken through Figure 1 approximately on the line 4—4 and looking upwardly in the direction of the arrows.

Figure 5 is an outboard elevational view of a modified form of the invention especially adapted to front wheel use.

Referring in detail to the drawings, and first to Figures 1 through 4 thereof, the numeral 5 generally designates the rim carrying portion of the wheel which is substantially in the form of a cylinder to the inner periphery of which are connected the spokes 6 which radiate from the hub 7 which receives the axle of the vehicle (not shown). In the case of rear wheel employment, where greater amount of force is exerted in turning the wheels to drive the vehicle forward, as in the case of tractors, the present embodiment is especially adapted by reason of a greater number of connections between the member 5 and the pneumatic tire accommodating rims 8, 8′, and 8″, in the case of accommodating one, two or three rims, as the case may be. The rims have a substantially conventional form as indicated in Figures 1 and 3, but attached to opposite side portions thereof at suitably circumferentially spaced points are segmental flanges 9 and 10 which are arranged in pairs and project radially inwardly, terminating in an extremity which has secured thereto or formed thereon the radially inwardly facing angle iron form 11 which extends parallel to the axis of the wheel. To cooperate with these angle iron forms 11 the rim carrying element 5 is formed at at least two circumferentially adjacent points with rigidly mounted angle iron forms 12 which extend at least the full length of the member 5 as indicated in Figure 1 of the drawings, the members 12 fitting substantially exactly the angle iron forms 11 on the rims 8 and/or 8′ and/or 8″. In this embodiment of the invention the member 5 has at least two unfastened angle iron forms 12′ which are loosely disposed between pairs of ribs 13, 14 fastened to the exterior of the element 5, with tightening bolts 15 threaded radially through the wall of the member 5 as illustrated in Figure 2 to engage the crotch of the loose angle iron elements 12′ so as to push the same in a radially outward direction and forcibly into engagement with the angle iron forms 12′, so as to thereby tighten the entire rim securely on the member 5 in such longitudinal position on the member 5 as may have been selected beforehand. It is obvious that these provisions for ready demountability and longitudinal adjustment on the member 5 enable positioning a single rim 8 in any desired position on the member 5 or the positioning of two or more rims up to the capacity of the member 5, to suit any conditions met with in the operation of the vehicle. A suitable number of the bolts 15 will be distributed throughout the length of the element 5 to take care of proper tensioning of the loose angle iron forms 12′.

Referring now to the embodiment of the invention shown in Figure 5 which is particularly adapted to front wheel use, wherein the tractive force is less than in the case of rear wheels of a conventional tractor, this embodiment differs from that described by being provided with fewer connections between the rim carrier 5a and the rim or rims 8a which carries the pneumatic or other type of tire 16. In this particular embodiment the rim 8a is provided at three equally circumferentially spaced points with W-shaped forms 11a corresponding in function to the forms in the first described embodiment designated by the respective numerals 9, 10 and 11, and these W-forms are welded or otherwise suitably secured to the inner periphery of the rim 8a as illustrated in Figure 5. The rim supporting element 5a is provided at similar circumferentially spaced points with two rigidly mounted angle iron forms 12a corresponding in function to the rigidly secured forms 12 in the first described embodiment, and these fit in any selected two adjacent ones of the W forms 11a. In addition to the rigid forms 12a there is a loose angle iron form 12b corresponding to the loose forms 12' in the first described embodiment, and this is located between ribs 13a and 14a, between which is located the tightening bolt 15a which traverses the wall of the carrier 5a and engages in the crotch of the loose angle iron forms 12b so as to push the same outwardly into forcible engagement with the corresponding one of the W forms 11a and thereby tension and secure the rim 8a on the carrier 5a in a desired longitudinal position on the carrier. This last described arrangement also permits the use of one, two or more rims on the same carrier and with any desired spacing within the limits of the carrier.

To facilitate an understanding of the succeeding claims, it seems appropriate to interpret the so-called hub equipped carrier or foundation as a wheel characterized by a central hub and a surrounding felly, the latter being concentric to the hub and longitudinally elongated to provide what has been described as a cylinder. Surrounding the cylindrical felly and longitudinally adjustable from one end to the other, according to one phase of the concept, is the tire rim 8, this being provided on its inner peripheral portion with circumferentially spaced transversely disposed V-shaped elements alternatively describable as keeper seats or retention keyways, as the case may be. Cooperable with the keyways and interposed between the felly and rim are the fixed and movable detents 12 and 12', the latter being retractable and projectable in a radial direction to provide the adjustable interrelated means between the felly and rim to maintain the latter fixedly in predetermined adjusted position. Placing a further interpretation upon the assemblage disclosed one can clearly visualize the wheel structure characterized by the elongated cylindrical felly 5 having circumferentially spaced ribs extending the full length thereof, certain ribs being rigid and the others adjustable, this arrangement serving to accommodate, according to one phase of the invention, a single tire rim shiftable from end to end and having fixed means on its inner periphery to accommodate the ribs and to provide for adjustable clamping.

Although I have shown and described herein preferred embodiments of my invention, it is to be definitely understood that I do not desire to limit the application of the invention thereto, and any change or changes may be made in the structure and arrangement of the parts, within the spirit of my invention and the scope of the subjoined claims.

Having described the invention, what is claimed as new is:

1. A wheel comprising a rim carrier comprising at least one longitudinal fixed projection radially outwardly spaced from the center thereof, at least one radially movable longitudinal projection loosely supported in a similar radially outwardly spaced position and circumferentially spaced from the fixed projection, both projections occupying positions substantially parallel to the axis of the wheel, at least one tire carrying rim circumposed on said carrier and having longitudinal radially inwardly disposed elements arranged to receive the fixed and the movable projections of the carrier, and expanding means on the carrier for pushing the carrier's movable projection in a radially outward direction against the engaged longitudinal element of the rim so as to tension the rim on the carrier, said carrier projections and rim elements being slidable on each other to permit longitudinal adjustment of the rim along the carrier.

2. A wheel comprising a rim carrier comprising at least one longitudinal fixed member projecting radially outwardly from the axis of the wheel, at least one radially movable longitudinal member similarly radially outwardly positioned from the axis of the wheel, both of said members being substantially parallel to the axis of the wheel, a plurality of tire accommodating rims circumposed on said carrier, each rim having radially inwardly disposed elements to supportably engage the said fixed and movable members on the carrier, and means on the carrier for forcibly expanding the movable members in a radially outward direction against the corresponding elements of the rims so as to tension the rims in position on the carrier, said members and said elements being slidable on each other in a relaxed condition of said means whereby to enable selective position of the rims along said carrier.

3. A wheel comprising a rim carrier comprising at least one fixed longitudinal member positioned radially outwardly from the axis of the wheel, only one radially movable longitudinal member mounted loosely in a similarly radially outward position, at least one tire accommodating rim circumposed on said carrier and having radially inwardly disposed longitudinal elements in which the fixed and loose longitudinal elements of the carrier seat, and means for moving the movable longitudinal member in a radially outward direction against the corresponding longitudinal element of the rim so as to tension the rim in position on the carrier, the engaged members and elements being slidable on each other to enable longitudinal adjustment of the rim along the carrier while said means is relaxed.

4. In an adjustable pneumatic tire rim assemblage of the class described, a wheel comprising a hub surrounded by a concentric felly, said felly being of elongated cylindrical form and provided with circumferentially spaced outstanding ribs on its outer peripheral surface, certain of said ribs being rigid, the remaining ribs being radially adjustable for tire rim binding and clamping purposes, and a tire rim concentrically surrounding the felly and circumposed on the ribs, said tire rim being provided on its inner periphery with keeper seats slidably engaging and receiving said ribs.

5. As a component part of a wheel and rim assembly of the class described, a wheel embodying a longitudinally elongated cylindrical felly, a pair of circumferentially spaced parallel ribs fixedly secured to the outer periphery of said felly, a pair of additional relatively movable ribs parallel to each other and to said first named rigid ribs, said movable ribs being radially adjustable toward and from the felly, and retaining and adjusting means for said movable ribs carried by said felly.

WALTER J. JAEGER.